Nov. 29, 1927.
Re. 16,799
J. S. BURDGE
ROAD STRUCTURE AND PROCESS OF MAKING
Original Filed April 5, 1920
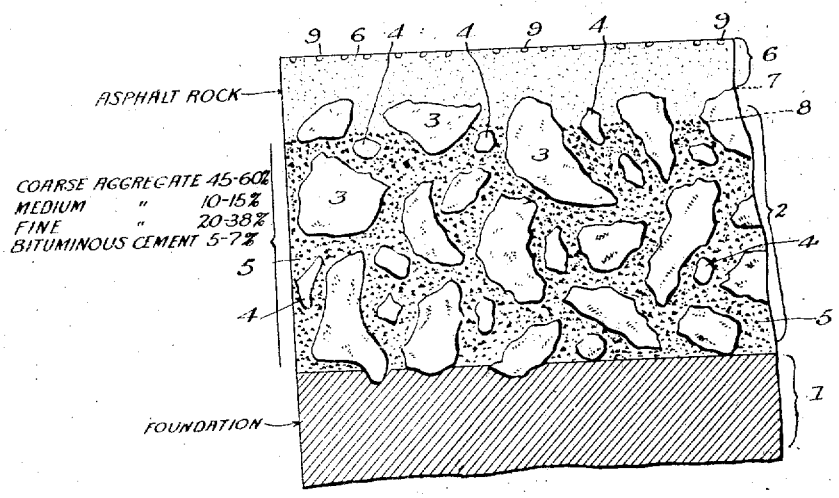
Inventor
Jefferson S. Burdge
By William W. Deane
his Attorney Reissued Nov. 29, 1927. Re. 16,799

UNITED STATES PATENT OFFICE.

JEFFERSON S. BURDGE, OF HUNTINGTON PARK, CALIFORNIA, ASSIGNOR TO WARREN BROTHERS COMPANY, OF BOSTON, MASSACHUSETTS, A CORPORATION OF WEST VIRGINIA.

ROAD STRUCTURE AND PROCESS OF MAKING.

Original No. 1,390,194, dated September 6, 1921, Serial No. 371,406, filed April 5, 1920. Application for reissue filed September 7, 1923. Serial No. 661,532.

The present invention relates to the production of permanent and wear-resisting road pavements, and has for its object the production of roads of improved permanence, stability, and wear-resistance.

In preparing roads according to the present invention, a suitable foundation is first prepared in any approved manner and of such materials as are available. This foundation may be prepared in any known manner, and may be rolled or otherwise compacted, if desired.

Upon the foundation is placed a layer constituting the lower portion of the finished wearing surface, this lower portion being preferably composed of the following materials in approximately the following proportions:

Coarse aggregate, which may be either crushed rock or slag, crushed or uncrushed gravel, passing a two-inch screen, but retained by a one-fourth inch screen, 45 to 60%.

Medium aggregate, which may be either crushed rock or slag, crushed or uncrushed gravel, or sand passing a one-fourth inch screen and retained by a one-tenth inch screen, 10 to 15%.

Fine aggregate, which may be either crushed gravel, slag or rock, or sand passing a one-tenth inch screen, 20 to 38%.

Bituminous cement, 5 to 7%.

The bituminous cement employed in this lower portion should be of such a character that it will become thoroughly molten at a temperature of 350° F., or less, and the amount stated above is found to be entirely sufficient for producing the structural, weight-sustaining, displacement-resisting portion. Upon this is placed the wear-resisting or finishing portion.

Preferably the materials forming the lower portion are previously thoroughly mixed and applied to the roadway while hot, so that the bituminous cement will be soft and plastic. The thickness of the layer forming the first portion will depend upon the character of the foundation upon which it is laid and the amount and the character of the traffic to which it is to be subjected, but generally a depth of from 1 to 3 inches is to be preferred. It should contain about 50% or say 45 to 60% of coarse aggregate, and it is advisable that the largest of the pieces of the mineral aggregate in the structural portion should be of a size equal to about one half of the depth or thickness of the completed wearing surface. The aggregate, stone, gravel, or slag, sand, etc., employed in the lower portion are preferably, heated to about 200 to 400° F., and mixed roughly whereupon the bituminous cement is added preferably in a molten condition, and the mass then mechanically mixed while at a temperature at which the bituminous cement is liquid or semi-liquid until a uniform mixture is produced, and this mixture is then spread preferably while hot upon the foundation to give the desired depth, and with its surface true to grade and contour. It is usually advisable not to compress or roll the lower portion at this stage.

The finishing or wear-resisting portion is then spread on the structural portion and this finishing portion consists of natural bituminous or asphaltic sand or rock, reduced to a granular condition by either pulverization or heat, that is to say, mineral matter which is naturally impregnated or coated with bituminous material, which natural bituminous rock or sand is known to possess remarkable properties of resistance to abrasion, such as is produced by traffic, but which by itself, is open to the objection of lacking stability and resistance to displacement or rutting under traffic.

In the production of the finishing portion I preferably add on top of the uncompacted lower portion a thin mat of this material, this being preferably applied while the lower portion is still hot, that is to say, before the bituminous cement therein has hardened or set. There are various kinds of natural bituminous or asphaltic sand or rock, which may be employed for this upper course, but it is preferable to use a material, the particles of which are thoroughly impregnated with pure asphaltum in such amount that 10 to 20% by weight of the material is soluble in carbon disulfid. If the natural bituminous or asphaltic sand or rock contains a substantially greater or less percentage of the soluble material than above specified, then it is advisable, for example during the grinding, pulverizing or heating operation, to add either a sufficient quantity of fine sand or crushed stone screenings or to add bituminous cement or a thick asphaltic oil in liquid form to secure a product within the range above stated. Obviously, the sand, crushed stone, bituminous cement or oil could be added at any other convenient stage of the operation, before spreading. The thickness of the wear-resisting portion will depend upon the amount and character of the travel which the road is to stand, prevailing temperature conditions and the like, but for ordinary purposes should be spread to a depth of from one fourth to three-fourths of an inch. The material forming this upper portion may be heated prior to spreading the same, but it is preferable to spread the same at ordinary atmospheric temperature, the spreading being performed while the material of the lower portion is still hot, as above stated.

The entire structure is then compressed as a unit, preferably by means of a self-propelled heavy roller until the finished wear-resisting portion and the lower structural portion become thoroughly compacted and completely united with each other. The operation of compression causes the natural bituminous or asphaltic sand or rock to become semi-plastic or plastic, due in part to heat developed by friction between the component particles of the structure during the process of compression and in part to the transmission of heat from the previously heated material forming the structural portion. While in this plastic condition, the grains of the upper portion are found to thoroughly unite with each other and to be thoroughy bonded to the lower structural portion.

After the finishing portion has been thoroughly compressed while it is still in a slightly plastic condition a light sprinkling of crushed stone, Portland cement, sand, gravel or pulverized stone or slag may, if desired, be uniformly applied and rolled into the same.

During the rolling or compacting operation the fine material constituting the top portion will enter the voids or cavities in the upper part of the lower portion to some extent thereby producing a very effective bonding of the upper and lower portions. It is to be understood, however, that considerable of the upper portion remains above the coarse material of the lower or structural portion. The amount depending upon the condition of the lower portion and the depth of the material used for the upper portion.

The annexed drawing illustrates a cross section of a road constructed in accordance with a preferred embodiment of the present invention. In said drawing, 1 represents the foundation, 2 represents a suitable lower or structural portion, this being composed of coarse aggregate, 3; medium aggregate, 4; and fine aggregate 5; proportioned preferably as above described and mixed with from 5 to 7% of bituminous cement, and 6 represents the surfacing or wear-resisting portion. I call attention to the zone between the lines 7 and 8, in which the two layers become thoroughly blended and united and bonded together, by compression. In the surface may be located the hard fine material 9, if desired.

I am, of course, familiar with bituminous or asphaltic concrete pavements, but I believe that the use of natural bituminous or asphaltic sand or rock, applied as above specified, as an abrasion-resisting surfacing, is an entirely new addition to the road building art.

While the lower structural portion described above, has been shown by tests, which have been made, to be especially suitable for use in my invention, I do not restrict myself to this particular lower structural portion, because any other bituminous mixture or bituminous coated road body which has sufficient weight-sustaining and displacement-resisting strength may also be used as the lower structural portion, therefore the application of such finely divided (granular or pulverized), natural asphaltic or bituminous rock or sand to any suitable bituminous mixture or bituminous coated road body, by the method herein described is within the scope of my invention.

As stated above, it is advisable to apply the wear-resisting upper portion upon the lower structural portion, while the latter is still in a heated condition (say, at between 200 and 400° F.). However, I do not restrict myself to this temperature range in the lower structural portion at the time of application of the material to constitute the wear-resisting portion and at the time of the compression of the pavement, since the primary object is to facilitate the proper blending and bonding together of the upper and lower portions of the pavement, during compression.

This bonding can be obtained when the bituminous cement in the lower structural portion is sufficiently hot and plastic to blend with the bituminous or asphaltic cement of the fine material constituting the upper portion. Accordingly any temperature at which the bituminous cement in the lower structural portion is plastic or liquid (i. e., any temperature at which it can flow) is to be considered as sufficiently elevated to come within the spirit of the present invention. This temperature, will of course, depend to a considerable extent upon the character of the bituminous cement present in the lower or structural portion.

I claim:

1. The improvement in road-building, which comprises the step of applying natural bituminous or asphaltic sand or rock in a granular condition in such amount as to leave a thin wear-resisting surfacing portion composed essentially of such material to a manufactured bituminous or asphaltic concrete pavement structure, while the latter is still hot.

2. The improvement in road-building which comprises the steps of applying a layer of cold, natural bituminous or asphaltic sand or rock in a granular condition in such amount as to leave a thin wear-resisting surfacing portion composed essentially of such material to a lower structural portion of a manufactured bituminous or asphaltic concrete pavement structure, while the latter is hot, and then compressing the structure, whereby said upper portion becomes heated and plastic during the process of laying over and compression into the heated, lower structural portion.

3. In the manufacture of a road, the process which comprises first spreading a structural portion comprising coarse and fine mineral aggregate and bituminous cement, such spreading being effected while the material is sufficiently hot for the cement to be plastic, then spreading thereupon, without previous compacting, a relatively thin portion of natural bituminous rock or sand, in a granular condition, and then compacting the compound structure while the lower layer is still hot.

4. In the manufacture of a road, the improvement which comprises spreading on a hot lower portion, a cold natural bituminous rock or sand, in a granular condition, and then compacting while the heat of the lower portion is retained in the mass.

5. A process of building a road structure which comprises spreading and grading a hot road-building material as a loose non-compacted body, then spreading thereupon a cold finely divided natural bituminous rock or sand, such second mentioned product being applied while the first mentioned material is in a hot non-compacted condition, and then compressing the entire structure to effect a blending and densification of the constituent parts of the said road structure, while the cold top material becomes heated and rendered plastic by the heat contained in the hot lower material.

6. A process of building a road structure which comprises spreading and grading a bituminous road-building material as a loose non-compacted body at a temperature at which the bituminous cement therein is fluent, then spreading thereupon a finely divided natural bituminous rock or sand, and then compressing the entire structure to effect a blending and densification of the constituent parts of the said road structure.

7. A process of building a road structure which comprises a spreading bituminous road-building material, then spreading thereupon a finally divided natural bituminous rock or sand in such amounts as to leave a surfacing portion consisting essentially thereof and then compressing the entire structure to effect a blending and densification of the constituent parts of said road structure.

8. In the construction of roads, the herein described improvement which comprises spreading comminuted natural bituminous rock or sand upon a lower structural portion, and then compressing the same, both of said operations being performed while said lower structural portion is at a temperature at which the bitumen content of such comminuted material can flow.

9. A composite road structure, comprising a lower structural portion and an upper wear-resisting portion, such lower portion comprising:—

| | Per cent. |
|---|---|
| Coarse mineral aggregate | 45 to 60 |
| Medium mineral aggregate $\frac{1}{10}$ to $\frac{1}{4}$ inch size | 10 to 15 |
| Fine mineral aggregate less than $\frac{1}{10}$ inch size | 20 to 38 |
| Bituminous cement | 5 to 7 |

and such upper portion consisting essentially of compacted natural bituminous rock or sand, containing 10 to 20% of bitumen soluble in carbon disulfid.

10. A complete pavement wearing surface having a lower structural portion consisting essentially of manufactured bituminous or asphaltic concrete or macadam or mortar, and an upper wear-resisting surfacing portion consisting essentially of natural bituminous rock or bituminous sand, such upper portion being more plastic than such structural portion, the two portions being blended together and united with each other, and a hard finely divided material incorporated into the surface of the said upper portion.

11. A road structure process of the character described, consisting in applying upon a compacted foundation a hot compound of three graded bodies of aggregate, relatively coarse, medium and fine with respect to each other, the coarse aggregate and the fine aggregate being proportionately greater in quantity than the medium aggregate, the said aggregate being compounded with bituminous cement comprising five to seven per cent of the compound and adapted to melt fully below 350° F., the said aggregates and cement compound being applied to the foundation without rolling, and a top wear-resisting portion of natural bituminous sand or rock in granular condition, the whole being finally compacted.

12. A road structure process of the character described, consisting in applying upon a compacted foundation a hot compound of three graded bodies of aggregate, relatively coarse, medium and fine with respect to each other, the coarse aggregate and the fine aggregate being proportionately greater in quantity than the medium aggregate, the coarse aggregate being proportionately greater in quantity than the fine aggregate, the said aggregates being compounded with bituminous cement adapted to melt fully below 350° F., the said aggregates and cement compound being applied to the foundation without rolling, and a top wear-resisting portion of natural bituminous sand or rock in granular condition, the whole being finally compacted.

13. A road structure process of the character described, consisting in applying upon a compacted road foundation a hot compound of three graded bodies of aggregates, relatively coarse, medium and fine with respect to each other, the coarse aggregate and the fine aggregate being proportionately greater in quantity than the medium aggregate, the said coarse aggregate being substantially double in quantity as compared with the quantity of the fine aggregate, the said aggregates being compounded with bituminous cement comprising five to seven per cent of the compound and adapted to melt fully below 350° F., the said aggregates and cement compound being applied to the foundation without rolling, and a top wear-resisting portion of natural bituminous sand or rock in granular condition, the whole being finally compacted.

In testimony whereof I affix my signature.

JEFFERSON S. BURDGE.